(12) United States Patent
Tomomatsu et al.

(10) Patent No.: US 8,810,842 B2
(45) Date of Patent: Aug. 19, 2014

(54) PRINTING SYSTEM, PRINTER, AND NON-TRANSITORY COMPUTER-READABLE MEDIUM STORING PRINTING CONTROL PROGRAM

(71) Applicant: Brother Kogyo Kabushiki Kaisha, Nagoya (JP)

(72) Inventors: Yoshitsugu Tomomatsu, Nagoya (JP); Masahiro Sugimoto, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/803,913

(22) Filed: Mar. 14, 2013

(65) Prior Publication Data

US 2013/0286427 A1 Oct. 31, 2013

(30) Foreign Application Priority Data

Apr. 27, 2012 (JP) .................................. 2012-104118

(51) Int. Cl.
*G06F 3/12* (2006.01)
*G06K 15/00* (2006.01)
(52) U.S. Cl.
USPC ........................... 358/1.15; 358/1.14; 358/1.1
(58) Field of Classification Search
None
See application file for complete search history.

(56) References Cited

U.S. PATENT DOCUMENTS

| 6,804,018 B1 | 10/2004 | Mochizuki |
| 8,169,639 B2 * | 5/2012 | Aoki et al. .................... 358/1.15 |
| 8,174,713 B2 * | 5/2012 | Yanagi et al. ................. 358/1.15 |

FOREIGN PATENT DOCUMENTS

| JP | 2000-238388 | 9/2000 |
| JP | 4199622 | 12/2008 |
| JP | 2009-282728 | 12/2009 |
| JP | 2012-192575 | 10/2012 |

* cited by examiner

*Primary Examiner* — Dave Moore
*Assistant Examiner* — Marcus T Riley
(74) *Attorney, Agent, or Firm* — McCarter & English, LLP

(57) ABSTRACT

A printer includes a storage portion, a printing portion, and a processor. The processor is configured to control the printer to cause the storage portion to store job identification information and device identification information that have been received from the device, cause the printing portion to perform printing based on the printing data that have been received from the device, specify a printing result for the printing job and transmit a result information record to the device that has transmitted a request command. The result information record includes the specified printing result and also includes the job identification information and the device identification information that are stored in the storage portion, to the device that has transmitted a request command.

10 Claims, 12 Drawing Sheets

FIG. 3

| | | | | | | | | | | | | | | | | | | |
|---|---|---|---|---|---|---|---|---|---|---|---|---|---|---|---|---|---|---|
| 1 | | | | | | | | | | | | | | | FF | 0 | 0 | 0 |
| 2 | | | | | | | | | | | | | | | 0 | 0 | 0 | 0 |
| 3 | | | | | | | | | | | | | | | 0 | 0 | 0 | 0 |
| 4 | | | | | | | | | | | | | | | 0 | 0 | 0 | 0 |
| 5 | | | | | | | | | | | | | | | 0 | 0 | 0 | 0 |
| 6 | | | | | | | | | | | | | | | 0 | 0 | 0 | 0 |
| 7 | | | | | | | | | | | | | | | 0 | 0 | 0 | 0 |
| 8 | | | | | | | | | | | | | | | 0 | 0 | 0 | 0 |
| 9 | | | | | | | | | | | | | | | 0 | 0 | 0 | 0 |
| 10 | | | | | | | | | | | | | | | 0 | 0 | 0 | 0 |

Columns: DEVICE ID (MacAddr), JOB ID, RESULT CODE

100

PRINTING SYSTEM, PRINTER, AND NON-TRANSITORY COMPUTER-READABLE MEDIUM STORING PRINTING CONTROL PROGRAM

CROSS-REFERENCE TO RELATED APPLICATION

This application claims priority to Japanese Patent Application No. 2012-104118, filed Apr. 27, 2012, the disclosure of which is incorporated herein by reference in its entirety.

BACKGROUND

The present disclosure relates to a printing system that includes a device and a printer that are connected through a network, a printer that can perform printing based on printing data that are received through a network, and a non-transitory computer-readable medium that stores a printing control program that is executed on a device that transmits printing data to a printer through a network.

A printing system is known that includes a device and a printer that are connected through a network. Generally, in this sort of printing system, information about the status of a printer (for example, an idling status, a printing status, an error status, or the like) is provided to a device that is connected to the printer. However, the device cannot recognize the printing statuses of individual sets of printing data (for example, the printing data sets for which printing has been completed, the printing data sets for which printing errors have occurred, and the like).

Accordingly, an image forming system is known in which a printing completion notification is transmitted from the printer to a personal computer on a per-job basis, a job being the unit in which the printing data sets are created. In the image forming system, the printing data incorporate job ID information for specifying the job and are transmitted from the personal computer to the printer. In the printer, the printing is performed based on the printing data that have been received from the personal computer, and the completion of the printing is detected. When job ID information for reference is transmitted from the personal computer to the printer, a determination is made by the printer as to whether or not the job ID information for reference matches the job ID information for specifying the job. In a case where the job ID information for reference matches the job ID information for specifying the job, the printing completion notification is transmitted from the printer to the personal computer.

SUMMARY

In the image forming system that is described above, even in a case where a print source personal computer that transmits the printing data is different from a request source personal computer that transmits the job ID information for reference, if the job ID information for specifying the job and the job ID information for reference match, the printing completion notification is transmitted to the request source personal computer. The possibility exists that the print source personal computer will not be able to recognize the result of the printing that was based on the printing data that the print source personal computer transmitted.

Various embodiments of the general principles herein provide a printing system, a printer, and a non-transitory computer-readable medium that stores a printing control program that enable a device that initiates a printing job to recognize the result of printing that is performed by the printer based on the printing job.

The embodiments described herein provide a printing system that includes a printer and a device that are configured to be connected with each other through a network. The device includes a processor that is configured to control the device to transmit to the printer, every time a printing job is initiated, the printing job being a unit in which the printer performs printing, job identification information that is unique to the printing job and device identification information that is unique to the device, transmit printing data for the printing job to the printer, transmit to the printer, every time a specified time interval elapses, a request command that requests a printing result for the printing job, determine, in a case where a result information record that includes the printing result, the job identification information, and the device identification information has been received from the printer, whether a specified termination condition for the printing job has been satisfied, based on the result information record that has been received and on the job identification information and the device identification information that the device has transmitted, and terminate the printing job in a case where it has been determined that the termination condition for the printing job has been satisfied. The printer includes a storage portion, a printing portion, and a processor. The storage portion stores the job identification information and the device identification information in a case where the job identification information and the device identification information have been received from the device. The printing portion performs printing based on the printing data in a case where the printing data have been received from the device. The processor is configured to control the printer to specify the printing result based on a printing status for the printing portion, and transmit, in a case where the request command has been received from the device, the result information record that includes the specified printing result and also includes the job identification information and the device identification information that are stored in the storage portion, to the device that has transmitted the request command.

The exemplary embodiments described herein also provide a printer that is configured to be connected to a device through a network. The printer includes a storage portion, a printing portion, and a processor. The storage portion is configured to store information. The printing portion is configured to perform printing based on printing data for a printing job. The printing job is a unit in which the printer performs printing. The processor is configured to control the printer to cause the storage portion to store job identification information that is unique to the printing job and device identification information that is unique to the device, in a case where the job identification information and the device identification information have been received from the device, cause the printing portion to perform printing based on the printing data, in a case where the printing data have been received from the device, specify a printing result for the printing job, based on a printing status of the printing portion, and transmit, in a case where a request command that requests the printing result has been received from the device, a result information record that includes the specified printing result and also includes the job identification information and the device identification information that are stored in the storage portion, to the device that has transmitted the request command.

The exemplary embodiments described herein also provide a non-transitory computer-readable medium that stores a printing control program. The printing control program includes instructions that cause a computer of a device that is configured to be connected to a printer through a network to execute the steps of transmitting to the printer, every time a printing job is initiated, the printing job being a unit in which the printer performs printing, job identification information that is unique to the printing job and device identification information that is unique to the device, transmitting printing data for the printing job to the printer, transmitting to the printer, every time a specified time interval elapses, a request command that requests a printing result for the printing job, determining, in a case where a result information record that includes the printing result, the job identification information, and the device identification information has been received from the printer, whether a specified termination condition for the printing job has been satisfied, based on the result information record that has been received and on the job identification information and the device identification information that the device has transmitted, and terminating the printing job in a case where it has been determined that the termination condition for the printing job has been satisfied.

BRIEF DESCRIPTION OF THE DRAWINGS

Embodiments of the present disclosure will be described below in detail with reference to the accompanying drawings in which:

FIG. 3 is a figure that shows a data configuration of a result information table;

DETAILED DESCRIPTION

Figure 1:
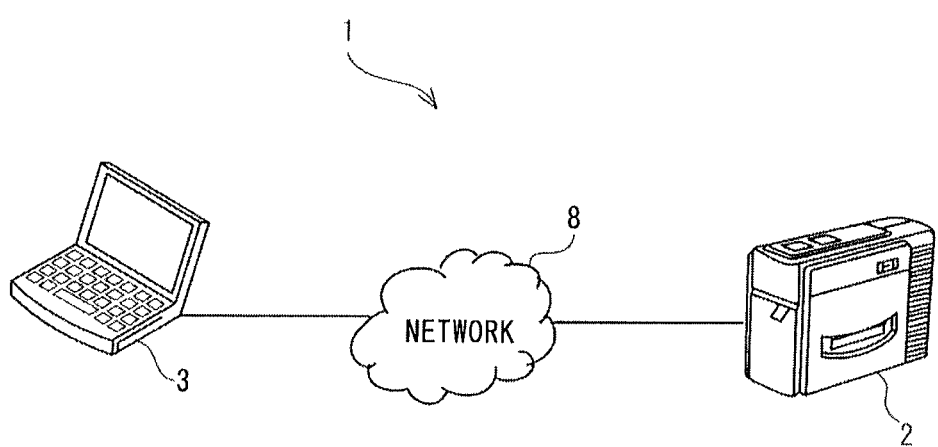
FIG. 1 is an overall configuration diagram of a printing system.

Hereinafter, an embodiment that implements the present disclosure will be explained with reference to the drawings. Device configurations, flowcharts for various types of processing, and the like that are shown in the drawings are merely explanatory examples and do not serve to restrict the present disclosure to the configurations, flowcharts, and the like that are shown.

A first embodiment of the present disclosure will be explained. A printing system 1 according to the present embodiment will be explained with reference to FIG. 1. In the printing system 1, a printer 2 and a personal computer (PC) 3 are configured to be connected with each other through a network 8 (for example, a LAN, a WAN, or the like). The printer 2 is a compact label printer that is configured to create a self-sticking label by printing characters (text characters, symbols, graphics, and the like) on a tape. The printer 2 is configured to be connected to multiple devices (for example, the PC 3) through a network 8. The PC 3 is a device that is configured to create data (hereinafter called the printing data) that are required in order for the printer 2 to create a label and that is configured to cause the printer 2 to perform printing based on the printing data.

In the PC 3, when a user edits an image of a label and inputs a print command, a printing job is initiated that controls the printing of the edited image. The printing job is a unit in which the printer 2 performs printing, and a plurality of printing data items are associated with it. When the printing job is initiated, the plurality of the printing data items are transmitted to the printer 2 through the network 8. The printer 2 creates the label by performing printing on the tape based on the printing data that have been received from the PC 3.

Figure 2:
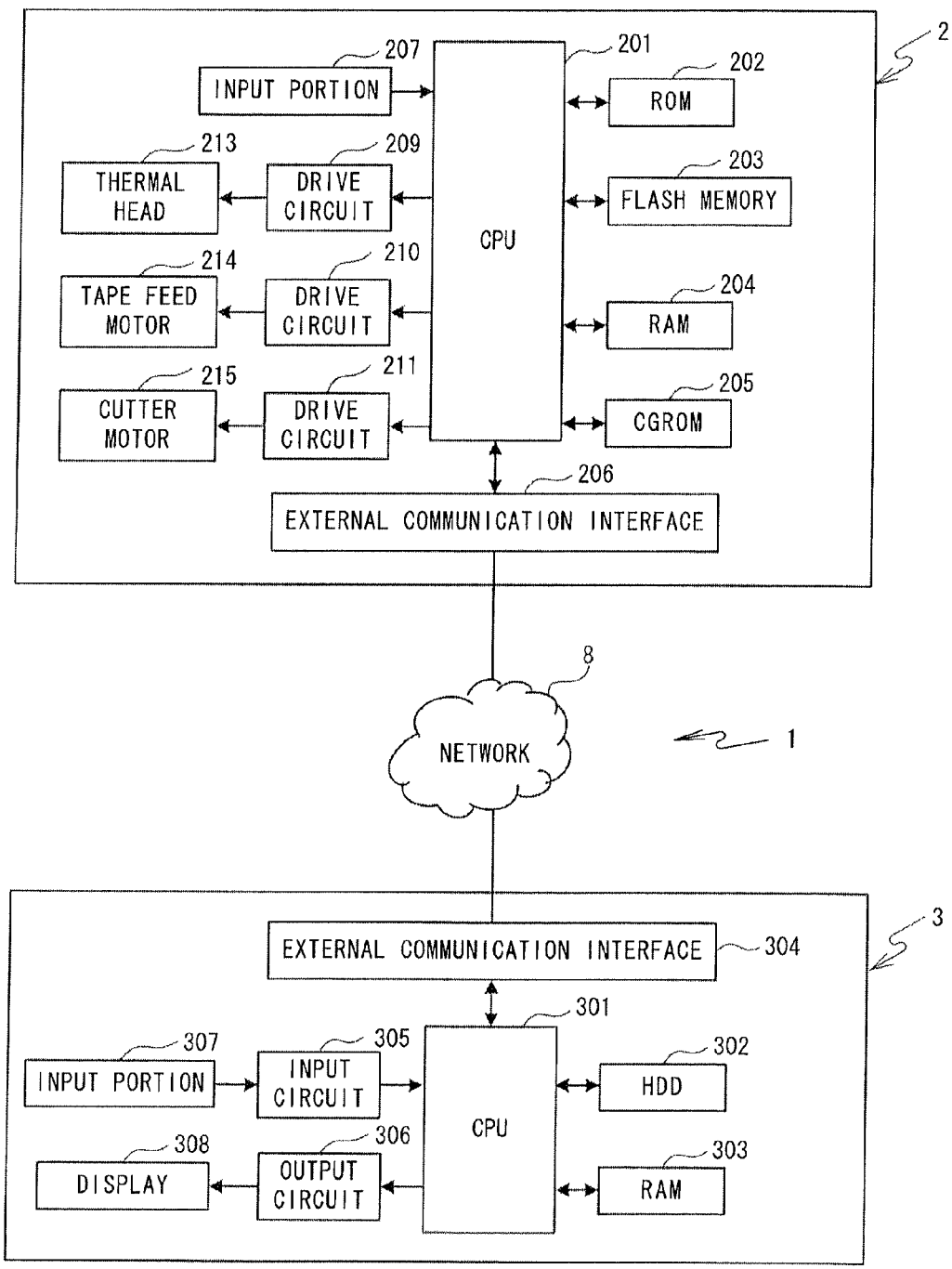
FIG. 2 is a block diagram that shows an electrical configuration of the printing system.

Electrical configurations of the printer 2 and the PC 3 will be explained with reference to FIG. 2. The electrical configuration of the printer 2 will be explained. The printer 2 is provided with a CPU 201 that performs control of the printer 2. The CPU 201 is connected to a ROM 202, a flash memory 203, a RAM 204, a CGROM 205, an external communication interface 206, an input portion 207, and drive circuits 209 to 211.

Various types of programs that the CPU 201 executes are stored in the ROM 202. Various types of data for settings are stored in the flash memory 203. A storage area is provided in the flash memory 203 for a result information table 100 (refer to FIG. 3) that will be described later. Various types of temporary data are stored in the RAM 204. A receiving buffer, a print buffer, a status buffer, and the like are provided in the RAM 204. The receiving buffer is a storage area in which are temporarily stored various types of data that have been received from a device (for example, the PC 3). The print buffer is a storage area into which are loaded the printing data from the receiving buffer. The status buffer is a storage area in which are stored status data that indicate a status of the printer 2.

Printing dot pattern data for printing various types of characters (text characters, numerals, graphics, and the like) on the tape are stored in the CGROM 205. The external communication interface 206 is an interface (for example, a LAN adaptor) for connecting to the network 8. Through the external communication interface 206, the CPU 201 is configured to perform communication with a device (for example, the PC 3) that is connected to the network 8. The input portion 207 is a button for performing an input operation on the printer 2.

The drive circuit 209 drives a thermal head 213 that performs the printing on the tape. The drive circuit 210 drives a tape feed motor 214 that operates a platen roller (not shown in the drawings) that feeds the tape. The drive circuit 211 drives a cutter motor 215 that operates a cutter (not shown in the drawings) that cuts the printed tape. The CPU 201 creates a label by controlling the drive circuits 209 to 211 such that the printing is performed on the tape that is fed, and the printed tape is cut.

The electrical configuration of the PC 3 will be explained. The PC 3 is provided with a CPU 301 that performs control of the PC 3. The CPU 301 is connected to a hard disk drive (HDD) 302, a RAM 303, an external communication interface 304, an input circuit 305, and an output circuit 306. Various types of programs that the CPU 301 executes are stored in the HDD 302. An operating system, an application, and a printer driver that will be described later are stored in the HDD 302.

The RAM 303 stores various types of temporary data. The external communication interface 304 is an interface (for example, a LAN adaptor) for connecting to the network 8. Through the external communication interface 304, the CPU 301 is configured to perform communication with a device (for example, the printer 2) that is connected to the network 8.

The input circuit 305 performs control that sends a command to the CPU 301 from an input portion 307 (for example, a mouse, a keyboard, a touch panel, or the like). The output circuit 306 performs control that displays an image on a display 308 in response to a command from the CPU 301.

The printer 2 is provided with a power supply portion for connecting to an external power supply and with an internal battery that accumulates the electric power that is supplied from the external power supply, although these are not shown in the drawings. The printer 2 and the PC 3 are each provided with a connection interface (for example, a USB port) that is not shown in the drawing for connecting to each other. In a case where the printer 2 and the PC 3 are connected to each other, the printer 2 is able to perform printing based on the printing job from the PC 3, in the same manner as described above.

The PC 3 is provided with a media reading device (for example, a CD-ROM drive) that is not shown in the drawings. Using the media reading device, the PC 3 is configured to read a printer driver that is stored in a storage medium (for example, a CD-ROM), and install the printer driver in the HDD 302. The PC 3 may also receive the printer driver from a device (for example, the printer 2) that is connected to the PC 3 and from the network 8, and then install the printer driver in the HDD 302.

A data configuration in the result information table 100 will be explained with reference to FIG. 3. A plurality of records of result information that are generated in the printer 2, one record for each printing result for each printing job, can be stored in the result information table 100. In the present embodiment, a maximum of ten records of the result information can be stored in the result information table 100. Each of the result information records is configured at twenty bytes. In a state in which ten records of the result information have been stored in the result information table 100, the most recent result information record that is written to the result information table 100 is written over the oldest result information record.

Each of the result information records includes a device ID, a job ID, a result code, and the like. The device ID is identifying information that is unique to the PC 3 that has transmitted (that is, has generated) the printing job. The job ID is identifying information that is unique to the printing job. The result code indicates the printing result for the printing job. In the present embodiment, the device ID is the Media Access Control (MAC) address for the PC 3 and is configured at eight bytes. The job ID is a number (or a character string) that is assigned in ascending order to the printing job by the printer 2 and is configured at four bytes.

The result code is a four-byte data item that is assigned in accordance with the printing result for the printing job. Specifically, the first two bytes of the result code indicate a termination status, and the last two bytes indicate the number of pages for which the printing has been completed. In a case where the printing that is based on the printing job has had a normal termination, and in a case where a recoverable error that will be described later has occurred, the termination status is indicated by "01". In a case where the printing that is based on the printing job has been canceled, and in a case where a non-recoverable error that will be described later has occurred, the termination status is indicated by "00". For example, in a case where a printing job that prints three pages has had a normal termination, the number of pages for which the printing has been completed is indicated by "03", so the result code is "0103". In a case where a printing job that prints three pages is performed and a non-recoverable error occurs while the second page is being printed, the number of pages for which the printing has been completed is indicated by "01", so the result code is "0001".

The processing that is performed by the printing system 1 will be explained with reference to FIGS. 4 to 12, with the processing that is performed by the printer 2 and the processing that is performed by the PC 3 being explained separately.

Main processing and host response processing to be performed by the printer 2 will be explained with reference to FIGS. 4 to 10. When the power supply to the printer 2 is turned on, the main processing and the host response processing are performed in parallel by the CPU 201 (refer to FIG. 2), based on a control program that is stored in the ROM 202 (refer to FIG. 2).

Figure 4:
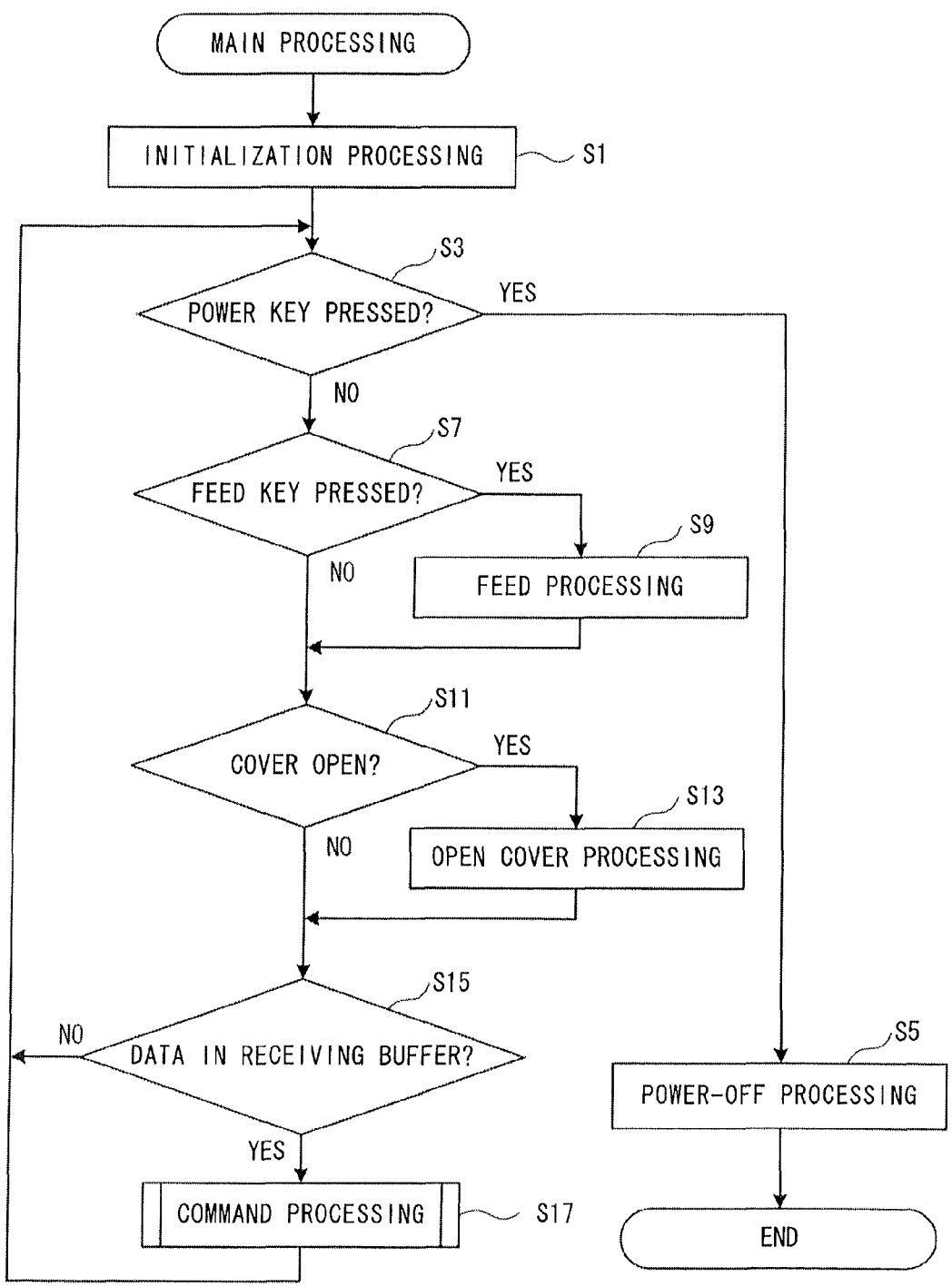
FIG. 4 is a flowchart of main processing in a printer.

As shown in FIG. 4, in the main processing by the printer 2, first, known initialization processing is performed, and the printer 2 enters an initialized state (Step S1). Next, a determination is made as to whether or not a Power key (not shown in the drawings) of the printer 2 has been pressed (Step S3). In a case where the Power key has been pressed (YES at Step S3), known power-off processing is performed, and the printer 2 enters a terminated state (Step S5). Then the power supply to the printer 2 is turned off, and the main processing is terminated.

In a case where the Power key has not been pressed (NO at Step S3), a determination is made as to whether or not a Feed key (not shown in the drawings) of the printer 2 has been pressed (Step S7). The user presses the Feed key in a case where the tape will be fed in order to start the printing from an intermediate position in a tape feed direction, for example, as well as in a case where the tape will be discharged after the printing when the length of the tape in the feed direction is longer than a specified value. In a case where the Feed key has been pressed (YES at Step S7), feed processing is performed (Step S9).

In the feed processing at Step S9, the tape feed motor 214 (refer to FIG. 2) is driven through the drive circuit 210, and the tape is fed by a specified amount. In a case where an error occurs while the tape feed motor 214 is in operation, the tape feed motor 214 is stopped, and error processing is performed. For example, in a case where the cutter (not shown in the drawings) is not at an origin point position, a determination is made that a cutter error has occurred. In that case, the tape feed motor 214 is stopped, and error processing is performed that returns the cutter (not shown in the drawings) to the origin point position.

After Step S9 has been executed, as well as in a case where the Feed key has not been pressed (NO at Step S7), a determination is made as to whether or not a cover of the printer 2 is open (Step S11). A cassette mounting portion (not shown in the drawings), in which a cassette that contains a tape can be removably mounted, and a cover (not shown in the drawings) for opening and closing the cassette mounting portion are provided in the printer 2. In a case where the cover is open (YES at Step S11), open cover processing is performed (Step S13). The open cover processing at Step S13 waits until the cover is closed, and when the cover is closed, the tape is fed to a specified position from the cassette that has been mounted in the cassette mounting portion.

After Step S13 has been executed, as well as in a case where the cover is not open (NO at Step S11), a determination is made as to whether or not data are present in the receiving buffer (Step S15). In a case where data are present in the receiving buffer (YES at Step S15), command processing that will be described below is performed (Step S17). After Step S17 has been executed, as well as in a case where data are not present in the receiving buffer (NO at Step S15), the processing returns to Step S3.

Figure 5:
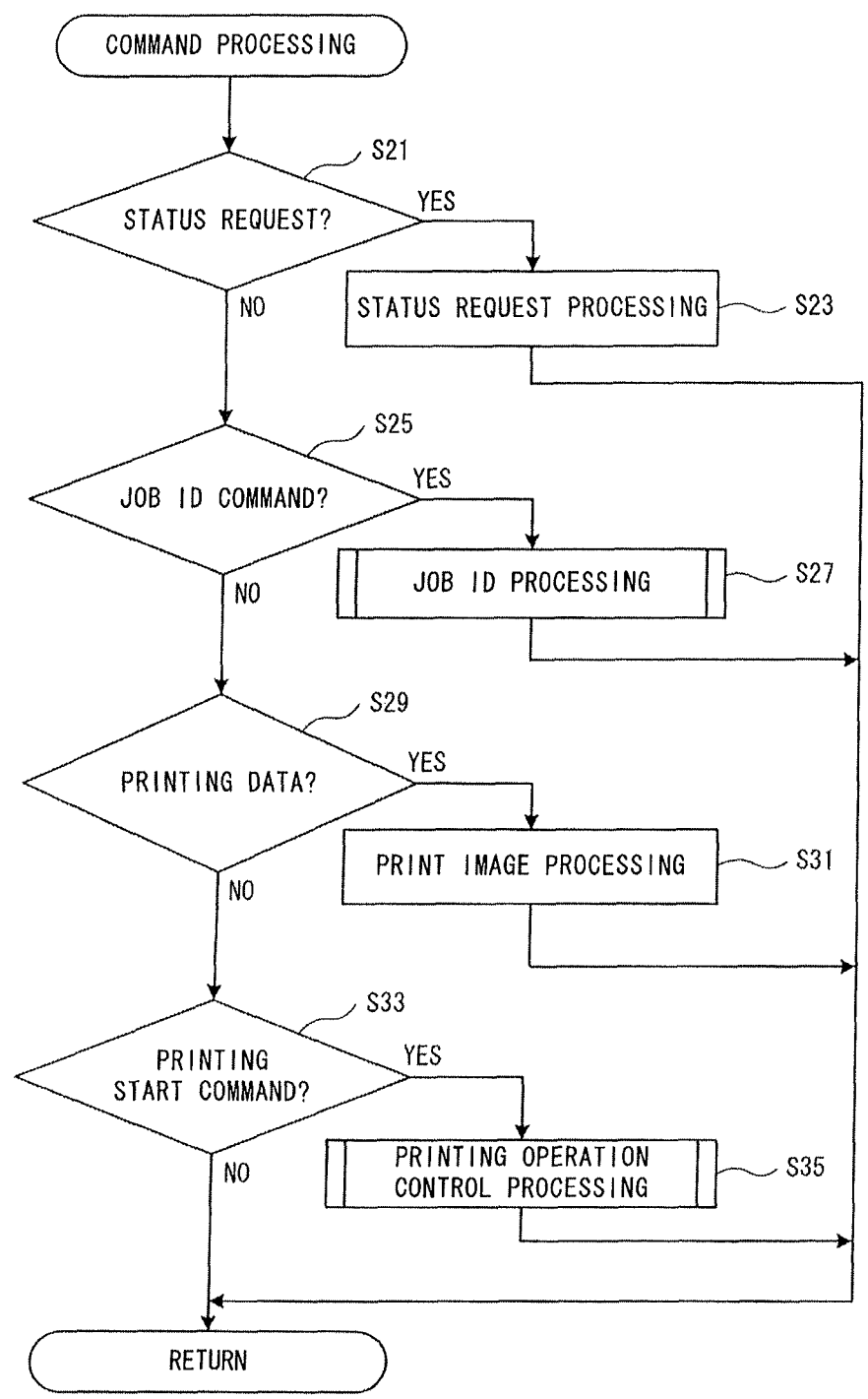
FIG. 5 is a flowchart of command processing.

As shown in FIG. 5, in the command processing at Step S17, first, a determination is made as to whether or not the data in the receiving buffer are a status request (Step S21). In a case where the data are the status request (YES at Step S21), status request processing is performed (Step S23). In the status request processing at Step S23, in a case where the printer 2 is connected as a USB printer class device to the PC 3, the status buffer is updated by storing information (status data) that indicates the current status in the status buffer. The status data that are stored in the status buffer are transmitted from the printer 2 to the PC 3 in response to an acquisition request from the PC 3, which is the host.

In a case where the data in the receiving buffer are not the status request (NO at Step S21), a determination is made as to whether or not the data in the receiving buffer are a job ID command (Step S25). In a case where the data are the job ID command (YES at Step S25), job ID processing that will be described later is performed (Step S27). The job ID command is a command that is transmitted from the PC 3, which initiated the printing job. The job ID command includes the device ID for the PC 3 that has transmitted the corresponding printing job, and the job ID for the corresponding printing job.

Figure 6:
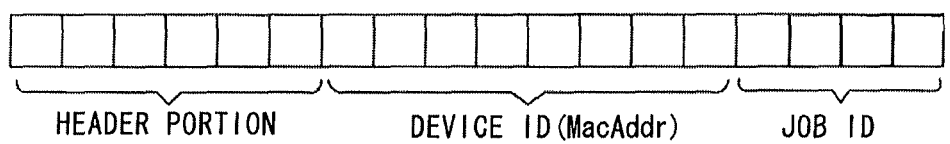
FIG. 6 is a figure that shows a data configuration for a job ID command.

The job ID command, an example of which is shown in FIG. 6, is a eighteen-byte data string that is generated for each printing job. The job ID command includes a header portion that is configured at six bytes, the device ID, which is configured at eight bytes, and the job ID, which is configured at four bytes. The header portion includes a command initial statement, the data size of the job ID command, type data, and the like. The command initial statement indicates that the command is the job ID command. The type data indicate that the destination for the job ID command is the printer 2.

As shown in FIG. 5. In a case where the data in the receiving buffer are not the job ID command (NO at Step S25), a determination is made as to whether or not the data in the receiving buffer are the printing data (Step S29). In a case where the data are the printing data (YES at Step S29), print image processing is performed (Step S31). In the print image processing at Step S31, in a case where raster printing control is performed, one line's worth of the printing data (image data) are loaded into the print buffer in the RAM 204 (refer to FIG. 2). In a case where ESC/P printing control is used, character data in a character code are generated based on the printing data and are copied to a specified position in the print buffer of the RAM 204.

In a case where the data in the receiving buffer are not the printing data (NO at Step S29), a determination is made as to whether or not the data in the receiving buffer are a printing start command (Step S33). In a case where the data are the printing start command (YES at Step S33), printing operation control processing that will be described later is performed (Step S35). In a case where the data in the receiving buffer are not the printing start command (NO at Step S33), as well as after one of Steps S23, S27, S31, and S35 is executed, the processing returns to the main processing (FIG. 4).

Figure 7:
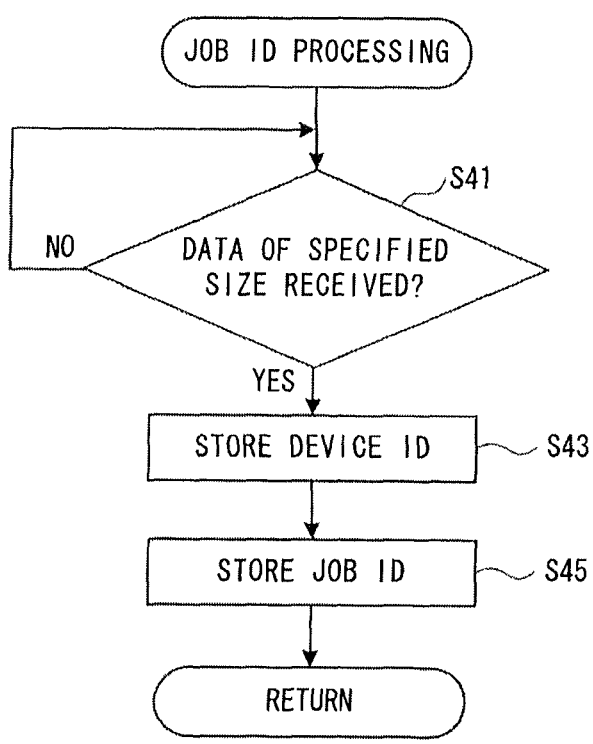
FIG. 7 is a flowchart of job ID processing.

As shown in FIG. 7, in the job ID processing at Step S27, a determination is made as to whether or not data of the specified size at which the job ID command is configured (in the present embodiment, eighteen bytes) have been received (Step S41). In a case where data of the specified size have not been received (NO at Step S41), the processing returns to Step S41 and waits for the receiving of data of the specified size. In a case where data of the specified size have been received (YES at Step S41), the device ID that is included in the received job ID command is temporarily stored in the RAM 204 (Step S43). The job ID that is included in the received job ID command is also temporarily stored in the RAM 204, in association with the device ID that was stored at Step S43 (Step S43). Then the processing returns to the command processing (FIG. 5).

Figure 8:
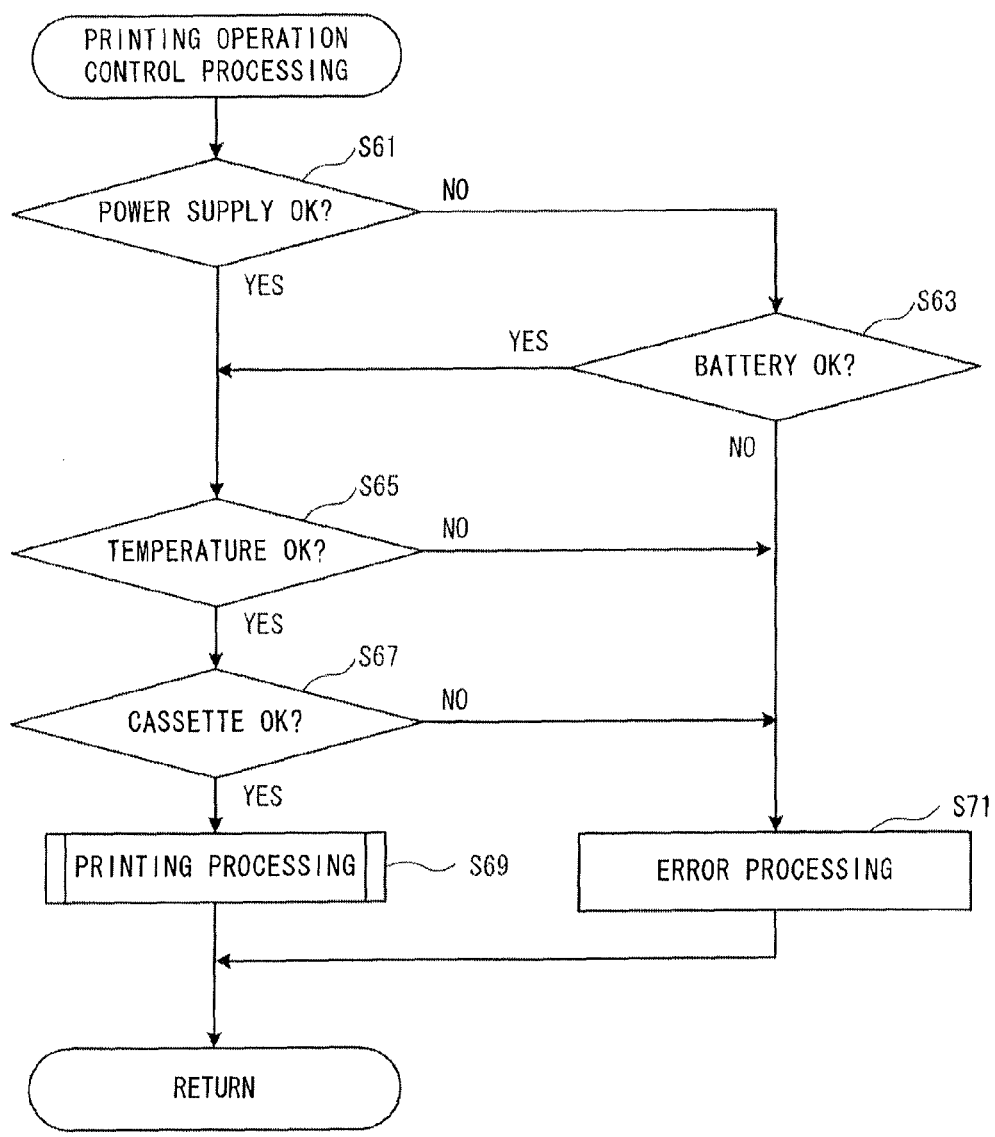
FIG. 8 is a flowchart of printing operation control processing.

As shown in FIG. 8, in the printing operation control processing at Step S35, first, a determination is made as to whether or not the power supply is OK (Step S61). In a case where the power supply for the printer 2 is less than a specified voltage, the determination is made that the power supply is not OK (NO at Step S61). In that case, a determination is made as to whether or not the battery is OK (Step S63). In a case where the charging capacity of the internal battery (not shown in the drawings) of the printer 2 is less than a specified capacity, the determination is made that the battery is not OK (NO at Step S63). In that case, error processing is performed based on an electric power error (Step S71). For example, an LED (not shown in the drawings) that is provided in the printer 2 one of lights and flashes in a pattern that indicates an electric power error, and the PC 3, which is the host, is notified that an electric power error has occurred.

In a case where the power supply is OK (YES at Step S61), as well as in a case where the battery is OK (YES at Step S63), a determination is made as to whether or not the temperature of one of the printer 2 body and the thermal head 213 (refer to FIG. 2) is OK (Step S65). In the printer 2, a temperature sensor (not shown in the drawings) is provided that detects the temperature of one of the printer 2 body and the thermal head 213. In a case where the temperature that is detected for the one of the printer 2 body and the thermal head 213 is high, that is, not less than a specified value, the determination is made that the temperature is not OK (NO at Step S65). In that case, the error processing is performed based on a high temperature error (Step S71). For example, the LED in the printer 2 one of lights and flashes in a pattern that indicates a high temperature error, and the PC 3, which is the host, is notified that a high temperature error has occurred.

In a case where the temperature is OK (YES at Step S65), a determination is made as to whether or not the cassette is OK (Step S67). In a case where the cassette has not been mounted in the cassette mounting portion (not shown in the drawings) of the printer 2, the determination is made that the cassette is not OK (NO at Step S67). In that case, the error processing is performed based on a cassette error (Step S71). For example, the LED in the printer 2 one of lights and flashes in a pattern that indicates a cassette error, and the PC 3, which is the host, is notified that a cassette error has occurred.

In a case where the cassette is OK (YES at Step S67), printing processing that will be described below is performed (Step S69). After one of Step S69 and Step S71 is executed, the processing returns to the command processing (FIG. 5).

Figure 9:
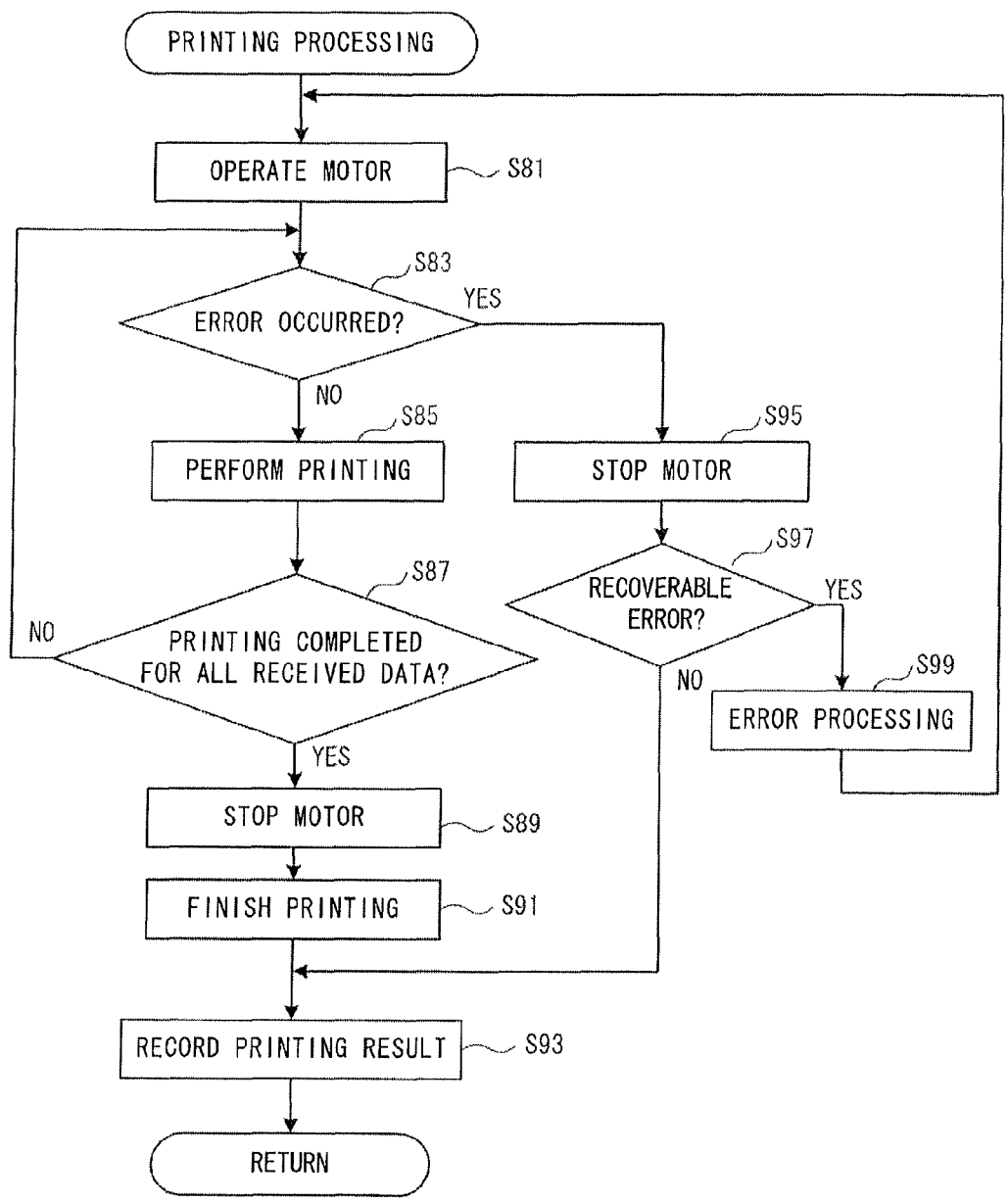
FIG. 9 is a flowchart of printing processing.

As shown in FIG. 9, in the printing processing at Step S69, first, the tape feed motor 214 is operated, and the tape is fed (Step S81). Next, a determination is made as to whether or not an error has occurred (Step S83). For example, in a case where a tape feeding error has occurred, such as faulty rotation of the platen roller (not shown in the drawings), a tape jam, or the like, the determination is made that an error has occurred (YES at Step S83). The determination that an error has occurred (YES at Step S83) is made in a case where any one of the various types of errors has occurred (the previously mentioned cutter error, the electric power error, the high temperature error, or the cassette error), as well as in a case where a hardware malfunction of the printer 2 has occurred (for example, a broken cutter, faulty rotation of the motor, or the like).

In a case where an error has not occurred (NO at Step S83), the thermal head 213 is operated, and the characters are printed on the tape in accordance with the printing data that were loaded into the print buffer of the RAM 204 (Step S85). Next, a determination is made as to whether or not the printing has been completed for all of the printing data that were received at Step S17 (that is, all of the printing data that are associated with the printing job) (Step S87). At Step S87, the determination as to whether or not the printing has been completed for all of the printing data may be made based on a number of pages to be printed that is indicated by the printing start command, and on the number of pages that have been printed by the thermal head 213.

In a case where the printing has been completed for all of the printing data (YES at Step S87), the tape feed motor 214 is stopped, and the feeding of the tape is terminated (Step S89). Furthermore, the cutter motor 215 (refer to FIG. 2) is operated, the printed tape is cut by the cutter (not shown in the drawings), and the printing that is based on the printing job is all finished (Step S91). In a case where the printing has not been completed for all of the printing data (NO at Step S87), the processing returns to Step S83.

After Step S91 is executed, the printing result for the printing job is recorded based on a printing status of the thermal head 213 (Step S93). Specifically, at Step S93, the printing result for the printing job (that is, the termination status of the printing processing that is based on the printing job, as well as the number of pages for which the printing has been completed) is specified based on the number of pages that have been printed by the thermal head 213 and whether or not the printing processing was interrupted by an error. The result code that indicates the specified printing result is stored as the result information in the result information table 100, in association with the device ID and the job ID that are temporarily stored in the RAM 204. Note that after Step S91 is executed, the printing processing that is based on the printing job has a normal termination, so the termination status that the result code indicates is "01".

In a case where an error has occurred (YES at Step S83), the tape feed motor 214 is stopped, and the feeding of the tape is terminated (Step S95). Next, a determination is made as to whether or not the error that has occurred is a recoverable error (Step S97). The recoverable error is a type of error for which the cause can be easily remedied. The recoverable error corresponds to the types of errors mentioned earlier (the cutter error, the electric power error, the high temperature error, the cassette error, the feeding error, and the like), for example.

In a case where a recoverable error has occurred (YES at Step S97), error processing for remedying the cause of the error is performed (Step S99). For example, in the case of a cutter error, error processing is performed that returns the cutter (not shown in the drawings) to the origin point position, as described previously. Then the processing returns to Step S81, and the printing processing is continued.

In a case where the error that has occurred is not a recoverable error (NO at Step S97), the error that has occurred is a non-recoverable error. The non-recoverable error is a type of error for which the cause is difficult to be remedied. The non-recoverable error corresponds to the previously mentioned hardware malfunction of the printer 2, for example. Even for a recoverable error, if the error condition will not be remedied for a long time, the error that has occurred may be regarded as a non-recoverable error, for example.

In a case where a non-recoverable error has occurred (NO at Step S97), the printing result for the printing job is recorded in the same manner as described previously, based on the printing status of the thermal head 213 (Step S93). In this case, the printing processing that is based on the printing job has an abnormal termination. In a case where an abnormal termination occurs due to a recoverable error, the termination status that the result code indicates is "01". In a case where an abnormal termination occurs due to a non-recoverable error, the termination status that the result code indicates is "00". After Step S93 is executed, the processing returns to the printing operation control processing (FIG. 8).

Figure 10:
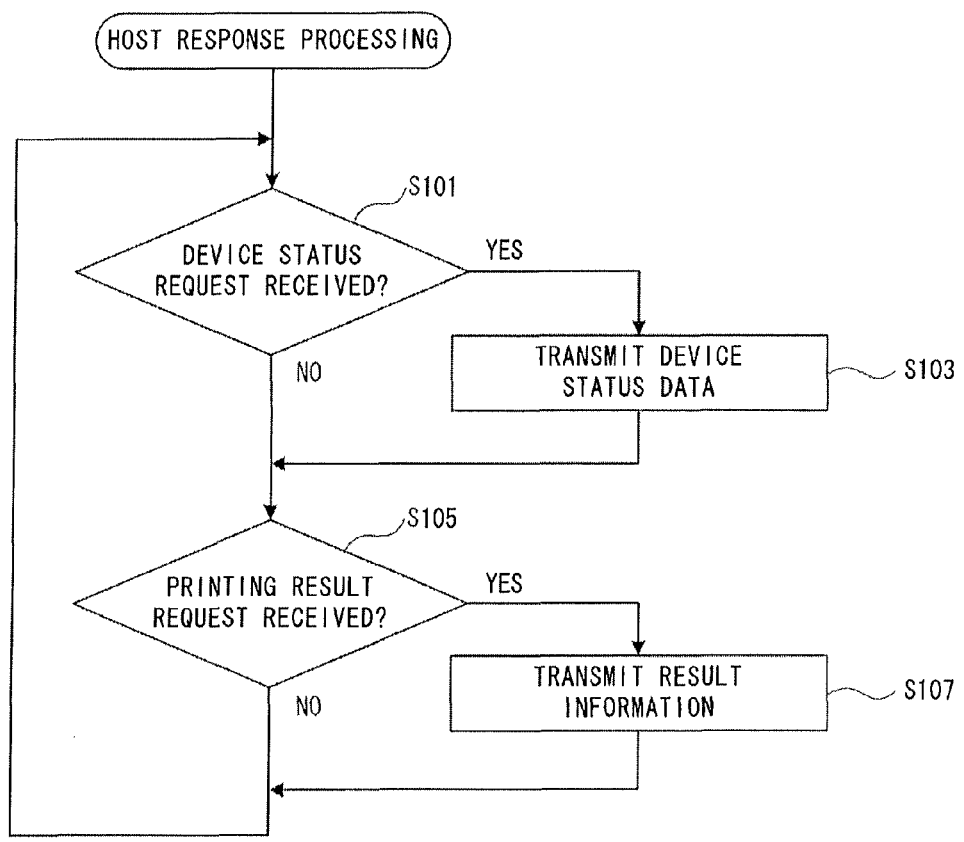
FIG. 10 is a flowchart of host response processing.

As shown in FIG. 10, in the host response processing in the printer 2, first, a determination is made as to whether or not a device status request has been received (Step S101). The device status request is a command that is transmitted through the network 8 from the PC 3 that is connected to the printer 2 and that requests the device status of the printer 2. In a case where the device status request has been received (YES at Step S101), device status data that indicate at least one of a normal status and an error status are transmitted as the device status of the printer 2 to the PC 3 that is the source of the request (Step S103).

After Step S103 is executed, as well as in a case where the device status request has not been received (NO at Step S101), a determination is made as to whether or not a printing result request has been received (Step S105). The printing result request is a command that is transmitted through the network 8 from the PC 3 that is connected to the printer 2 and that requests the printing result for the printing job. In a case where the printing result request has been received (YES at Step S105), all of the result information records that have been stored in the result information table 100 are transmitted to the PC 3 that is the source of the request (Step S107). After Step S107 is executed, as well as in a case where the printing result request has not been received (NO at Step S105), the processing returns to Step S101.

Print command processing that is performed by the PC 3 will be explained with reference to FIG. 11. In the PC 3, the user uses the application that is stored in the HDD 302 (refer to FIG. 2) to edit one of an image and a text that is to be printed and to input a print command. In the PC 3, the printer driver that is stored in the HDD 302 (refer to FIG. 2) is launched in response to the input of the print command, and the print command processing that is hereinafter described is performed by the CPU 301 (refer to FIG. 2).

Figure 11:
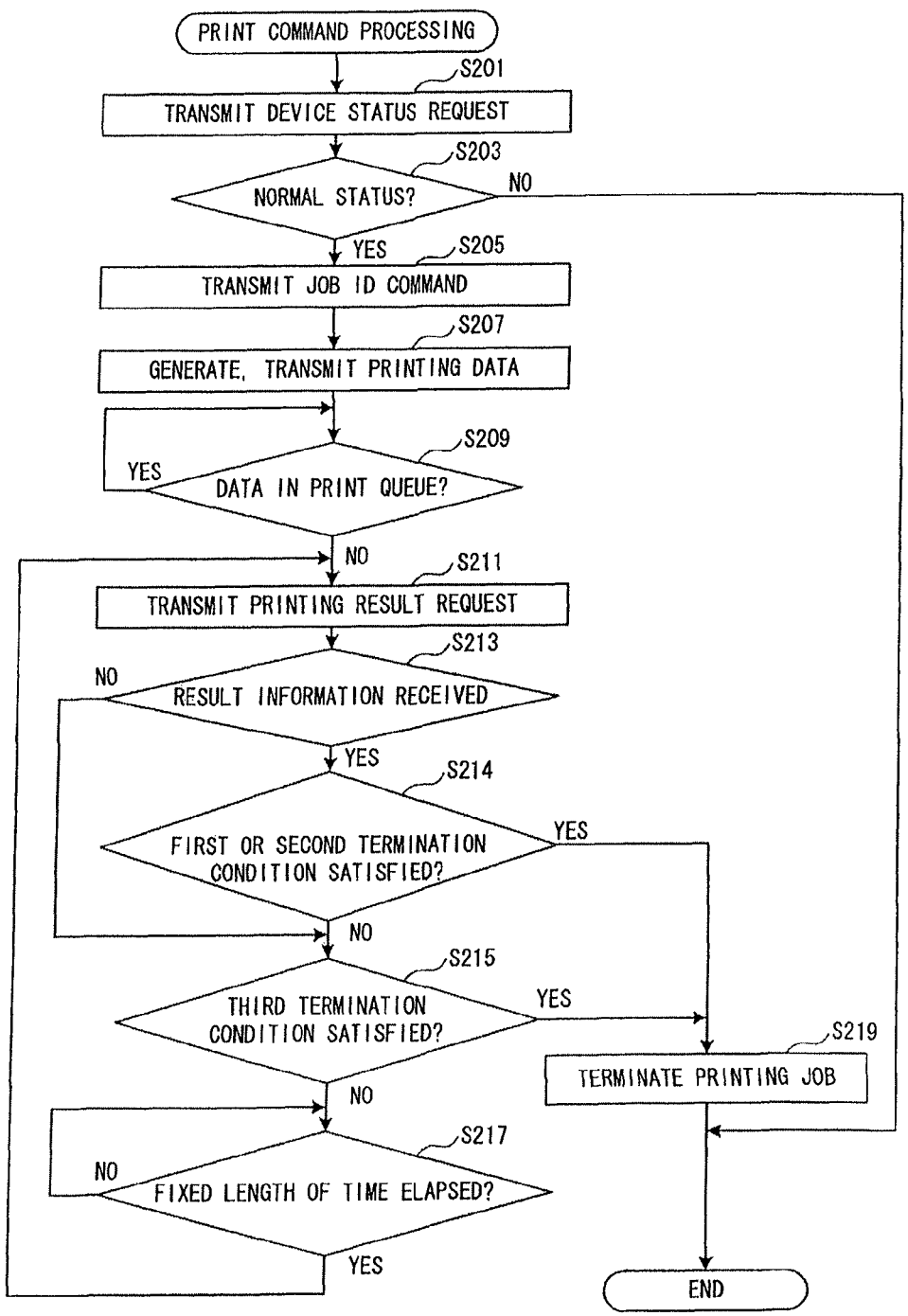
FIG. 11 is a flowchart of print command processing in a personal computer.

As shown in FIG. 11, in the print command processing in the PC 3, the device status request is transmitted to the printer 2 (Step S201). A determination is made as to whether or not the device status data that are transmitted from the printer 2 in response to the device status request indicate a normal status (Step S203). In a case where the device status data do indicate a normal status (YES at Step S203), the job ID command is transmitted to the printer 2 (Step S205). Specifically, the CPU 301 assigns a job ID to the printing job that is initiated by the input of the print command, the job ID being a unique number that is assigned in ascending order, and stores the job ID temporarily in the RAM 303 (refer to FIG. 2). The job ID command that is transmitted at Step S205 includes the job ID that is temporarily stored in the RAM 303 and the device ID that is unique to the PC 3.

After Step S205 is executed, the printing data are generated based on the one of the image and the text that is to be printed and are transmitted (Step S207). More specifically, the printing data are generated sequentially and are stored (spooled) in a print queue (not shown in the drawings) in the PC 3. The generated printing data are temporarily stored in the print queue until their transmission to the printer 2 is completed. The printing data that are stored in the print queue are read sequentially and transmitted to the printer 2, and the printing data that have been transmitted are deleted from the print queue.

Next, a determination is made as to whether or not the printing data are in the print queue (Step S209). In a case where the printing data are in the print queue (YES at Step S209), the transmission has not been completed for at least a portion of the printing data for the printing job, so the processing returns to Step S209. In a case where the printing data are not in the print queue (NO at Step S209), the transmission has been completed for all of the printing data for the printing job, and the printing data have been deleted from the print queue, so the printing result request is transmitted to the printer 2 (Step S211).

After Step S211 is executed, a determination is made as to whether or not the result information has been received from the printer 2 in response to the printing result request (Step S213). In a case where the result information has been received from the printer 2 (YES at Step S213), a determination is made as to whether or not the printing job satisfies one of a first termination condition and a second termination condition, based on the received result information and on the job ID and the device ID that the PC 3 has transmitted to the printer 2 at Step S205 (Step S214).

The first termination condition is satisfied in a case where the device ID and the job ID that are included in the result information match the device ID and the job ID that are stored in the PC 3. At Step S214, first, among all of the result information records that have been received, the result information records that include the device ID for the PC 3 (that is, the result information records that pertain to the PC 3) are specified. Next, in a case where one of the result information records that pertains to the PC 3 includes the job ID that matches the job ID that is temporarily stored in the RAM 303, the determination is made that the first termination condition has been satisfied (YES at Step S214).

The second termination condition is satisfied in a case where the device ID that is included in the result information matches the device ID that is stored in the PC 3 and the job ID that is included in the result information is greater than the job ID that is stored in the PC 3. At Step S214, first, among all of the result information records that have been received, the result information records that include the device ID for the PC 3 (that is, the result information records that pertain to the PC 3) are specified. Next, in a case where one of the result information records that pertains to the PC 3 includes a job ID that is greater than the job ID that is temporarily stored in the RAM 303, the determination is made that the second termination condition has been satisfied (YES at Step S214).

In a case where the result information has not been received from the printer 2 (NO at Step S213), as well as in a case where the printing job satisfies neither of the first termination condition nor the second termination condition (NO at Step S214), a determination is made as to whether or not the printing job satisfies a third termination condition (Step S215). The third termination condition is satisfied in a case where, after the first printing result request was transmitted at Step S211, a specified length of time (for example, 15 seconds) has elapsed without the result information that includes a job ID that is not less than the job ID that is stored in the PC 3 being received. That is, the third termination condition is satisfied in a case where, after the first printing result request was transmitted at Step S211, a specified length of time (for example, 15 seconds) has elapsed with none of the first termination condition and the second termination condition being satisfied).

When the first printing result request is transmitted after the print command processing is started, the CPU 301 starts counting a first elapsed time. At Step S215, in a case where the first elapsed time exceeds a specified length of time with none of the first termination condition and the second termination condition being satisfied, the determination is made that the printing job satisfies the third termination condition (YES at Step S215). Note that the determination is also made that the printing job satisfies the third termination condition in a case where, after the first printing result request was transmitted at Step S211, the specified length of time (for example, 15 seconds) has elapsed without the result information being received at Step S213 (YES at Step S215).

In a case where the printing job does not satisfy the third termination condition (NO at Step S215), a determination is made as to whether or not a fixed length of time (for example, 3 seconds) has elapsed since the point when the immediately preceding printing result request was transmitted at Step S211 (Step S217). Every time the printing result request is transmitted at Step S211, the CPU 301 starts counting a second elapsed time. In a case where the second elapsed time that is counted has reached the fixed length of time (YES at Step S217), the processing returns to Step S211. In a case where the counted second elapsed time has not reached the fixed length of time (NO at Step S217), the processing returns to Step S217. When the most recent printing result request is transmitted at Step S211, the counting of the second elapsed time is reset, and the counting is started once again from an initial value.

When the most recent printing result request is transmitted at Step S211, the determinations are made as to whether or not the printing job satisfies one of the first to the third termination conditions, in the same manner as described above. At Step S214, the determination is made as to whether or not the printing job satisfies one of a first termination condition and a second termination condition, based on the result information that was received in response to the most recent printing result request. Steps S211 to S217 are executed repeatedly until the printing job satisfies one of the first to the third termination conditions.

In a case where the printing job satisfies one of the first to the third termination conditions (YES at Step S214 or YES at Step S215), the printing operation that is based on the printing job is deemed to have been completed, so the printing job is terminated (Step S219). At Step S219, the job ID that is temporarily stored in the RAM 303 is deleted, and a completion message for the printing job and the printing result for the printing job are displayed on the display 308 (refer to FIG. 2). After Step S219 is executed, as well as in a case where the device status data indicate an error status (NO at Step S203), the print command processing (FIG. 11) is terminated.

The flow of the processing that is performed in the printing system 1, based on the flowcharts that have been described above, will be explained with reference to FIG. 12. In the explanation that follows, the steps that correspond to the flowcharts described above are shown in parentheses.

Figure 12:
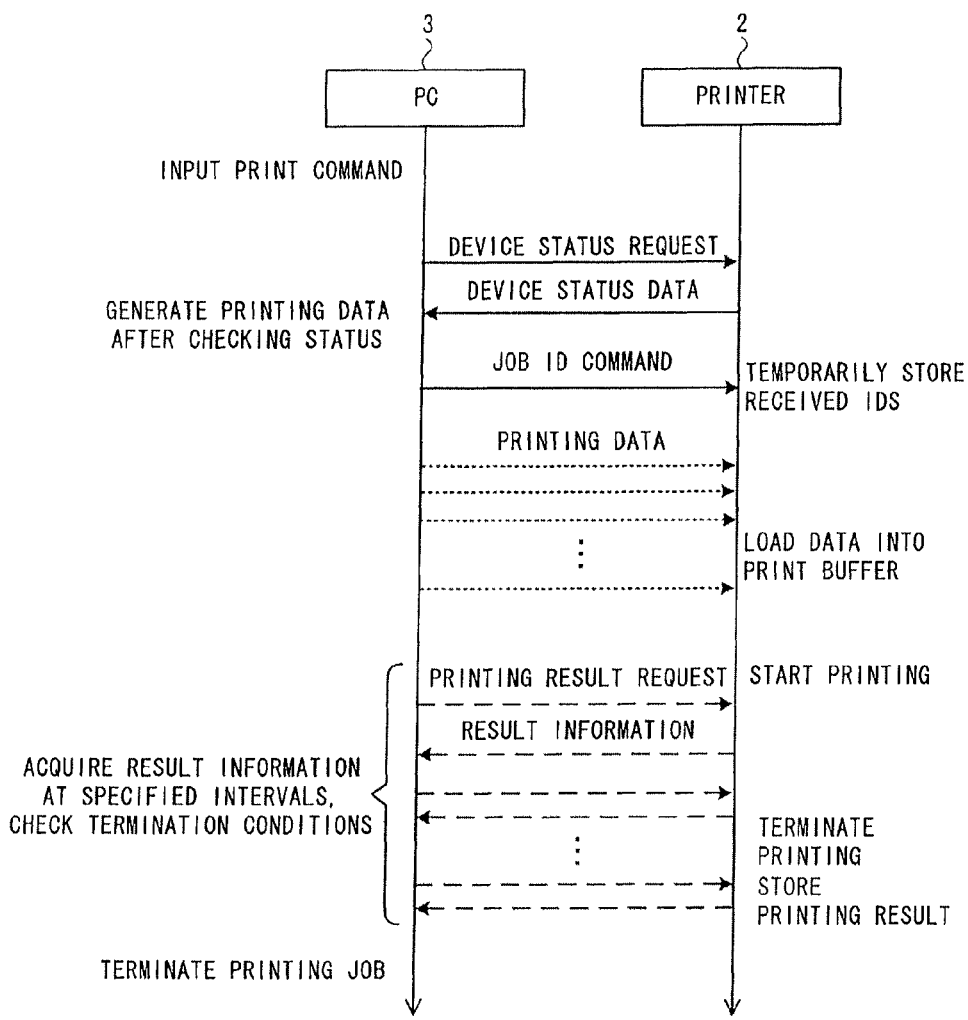
FIG. 12 is a figure that shows a flow of processing that is performed between the printer and the personal computer.

As shown in FIG. 12, when the print command is input, the PC 3 transmits the device status request to the printer 2 (Step S201). In response to the device status request, the printer 2 sends back the device status data (Step S103). If the PC 3 confirms that the device status is a normal status (YES at Step S203), the PC 3 transmits the job ID command to the printer 2 (Step S205). The PC 3 also generates the printing data for the printing job, stores the printing data in the print queue, and transmits the printing data to the printer 2 (Step S207).

The printer 2 temporarily stores the IDs (the device ID and the job ID) that are included in the job ID command it has received (Step S27). The printer 2 also loads the received printing data to the print buffer (Step S31) and starts the printing that is based on the printing job (Step S35). When the printing that is based on the printing job is terminated, the printer 2 stores, in the result information table 100, a result information record that includes the received IDs and the printing result for the printing job (Step S93).

When all of the printing data for the printing job have been deleted from the print queue (NO at Step S209), the PC 3 transmits the printing result request to the printer 2 at fixed intervals (Step S211). In response to the printing result request, the printer 2 sends back the result information records stored in the result information table 100 (Step S107). Based on the received result information records, the PC 3 checks whether or not the printing job satisfies one of the termination conditions (Steps S214, S215). In a case where the printing job does satisfy one of the termination conditions, the PC 3 terminates the printing job that is regarded as being in progress (Step S219).

As explained above, in the printing system 1 according to the present embodiment, the PC 3 transmits the job ID and the device ID to the printer 2 every time the PC 3 initiates a printing job, and the printer 2 stores the job ID and the device ID it receives. Next, the PC 3 transmits the printing data to the printer 2, and the printer 2 performs the printing based on the received printing data. The printer 2 stores the result information record, which includes the printing result that the printer 2 has specified and the job ID and the device ID that the printer 2 has received. After transmitting the printing data, the PC 3 transmits the printing result request to the printer 2 at specified intervals, and in response to the printing result request, the printer 2 transmits the result information record to the PC 3. Based on the result information record the PC 3 receives, and on the job ID and the device ID it transmitted, the PC 3 determines whether or not the printing job satisfies one of the specified termination conditions. In a case where the printing job does satisfy one of the specified termination conditions, the PC 3 terminates the printing job. Therefore, the printer 2 can make the PC 3, which initiated the printing job, to reliably check the result of the printing that the printer 2 performed based on the printing job reliably.

In the printer 2, in a case where the status of the printer 2 is a normal status, a determination is made as to whether or not the printing has been completed for all of the printing data for the printing job, based on the number of pages for which the printing by the thermal head 213 has been completed. In a case where the printing has been completed for all of the printing data, the printing result is recorded as indicating that the printing job has had a normal termination (NO at Step S83 to Step S93). Therefore, the printer 2 can make the PC 3, which initiated the printing job, to recognize that the printing result for the printing job is a normal termination.

In the printer 2, in a case where the status of the printer 2 is an error status, if the error type is a non-recoverable error, the printing result is recorded as indicating that the printing job has had an abnormal termination (YES at Step S83; Step S95; NO at Step S97; Step S93). Therefore, the printer 2 can make the PC 3, which initiated the printing job, to recognize that the printing result for the printing job is an abnormal termination.

In the printer 2, the printing result is recorded as indicating the number of pages for which the printing by the thermal head 213 has been completed (Step S93). Therefore, the printer 2 can make the PC 3, which initiated the printing job, to recognize an amount of the printing data for which the printing had been completed when the printing job was terminated.

In the PC 3, in a case where all of the printing data for the printing job have been deleted from the print queue, the printing result request is transmitted (YES at Step S209; Step S211). Therefore, the printing result can be acquired from the printer 2 at an earlier time and at a time when there is a strong possibility that the printing has been terminated by the printer 2. This makes it possible to terminate more quickly a printing job that is regarded as being in progress by the PC 3.

The condition for the termination of the printing job is that one of the first to the third termination conditions be satisfied (Step S214; Step S215). The first termination condition is satisfied in a case where the job ID that is included in the result information record that has been received from the printer 2 matches the job ID that the PC 3 has retained. The second termination condition is satisfied in a case where the job ID that is included in the result information record that has been received from the printer 2 is greater than the job ID that the PC 3 has retained. The third termination condition is satisfied in a case where, after the first printing result request has been transmitted, the specified length of time has elapsed with none of the first termination condition and the second termination condition being satisfied. Therefore, in the PC 3, the determination as to whether or not one of the termination conditions for the printing job has been satisfied can be made accurately by simple processing.

Note that the present disclosure is not limited to the embodiment that is described above, and modifications can be made within the scope of the present disclosure. For example, the device ID is not limited to being the MAC address, and it may be any information that makes it possible to identify the device uniquely. The job ID is not limited to being number that is assigned in ascending order, and it may be any information that makes it possible to identify the printing job uniquely.

In the embodiment that is described above, in response to the printing result request, the printer 2 sends all of the result information records that are stored in the result information table 100 back to the PC 3 (Step S107). Instead of this, the PC 3 may transmit to the printer 2 a printing result request that includes the device ID for the PC 3 (Step S211). The printer 2 may then take from the result information table 100 the result information records that include the device ID that is in the printing result request it received, and send only those result information records back to the PC 3 (Step S107). Thus the PC 3 can acquire from the printer 2 only the result information records that pertain to the PC 3, so the time that is required for the processing that determines the termination conditions (Steps S214, S215) can be shortened.

In the embodiment that is described above, the print command processing (FIG. 11) in the PC 3 is performed based on the printer driver, but a printing control program that performs the print command processing (FIG. 11) is not limited to being the printer driver. For example, within the print command processing (FIG. 11) in the PC 3, Steps S201, S203, and S207 are known processing, so they can be executed based on the same sort of printer driver as is already known. In contrast, Steps S205 and S209 to S219 may be executed based on a monitoring program that is provided separately from the printer driver. In that case, the present disclosure can be implemented simply by introducing the monitoring program into a known PC 3.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A printing system that includes a printer and a device that are configured to be connected with each other through a network, wherein the device includes a processor that is configured to control the device to transmit to the printer, every time a printing job is initiated, the printing job being a unit in which the printer performs printing, job identification information that is unique to the printing job and device identification information that is unique to the device, transmit printing data for the printing job to the printer, transmit to the printer, every time a specified time interval elapses, a request command that requests a printing result for the printing job, determine, in a case where a result information record that includes the printing result, the job identification information, and the device identification information has been received from the printer, whether a specified termination condition for the printing job has been satisfied, based on the result information record that has been received and on the job identification information and the device identification information that the device has transmitted, and terminate the printing job in a case where it has been determined that the termination condition for the printing job has been satisfied, and the printer includes a storage portion that stores the job identification information and the device identification information in a case where the job identification information and the device identification information have been received from the device, a printing portion that performs printing based on the printing data in a case where the printing data have been received from the device, and a processor that is configured to control the printer to specify the printing result based on a printing status for the printing portion, and transmit, in a case where the request command has been received from the device, the result information record that includes the specified printing result and also includes the job identification information and the device identification information that are stored in the storage portion, to the device that has transmitted the request command.

2. A printer that is configured to be connected to a device through a network, comprising:

a storage portion that is configured to store information;

a printing portion that is configured to perform printing based on printing data for a printing job, the printing job being a unit in which the printer performs printing; and a processor that is configured to control the printer to cause the storage portion to store job identification information that is unique to the printing job and device identification information that is unique to the device, in a case where the job identification information and the device identification information have been received from the device, cause the printing portion to perform printing based on the printing data, in a case where the printing data have been received from the device, specify a printing result for the printing job, based on a printing status of the printing portion, and transmit, in a case where a request command that requests the printing result has been received from the device, a result information record that includes the specified printing result and also includes the job identification information and the device identification information that are stored in the storage portion, to the device that has transmitted the request command.

3. The printer according to claim 2, wherein the processor is configured to cause the printer to determine whether a status of the printer is one of a normal status, in which the printing portion is able to perform printing, and an error status, in which the printing portion is not able to perform printing, determine, in a case where it has been determined that the status of the printer is the normal status, whether all of the printing data for the printing job have been printed, based on an amount of the printing data for which printing has been completed by the printing portion, and specify a normal termination of the printing job as the printing result in a case where it has been determined that all of the printing data for the printing job have been printed.

4. The printer according to claim 3, wherein the processor is configured to cause the printer to determine, in a case where it has been determined that the status of the printer is the error status, whether a type of the error status is one of a recoverable error and a non-recoverable error, and specify an abnormal termination of the printing job as the printing result in a case where it has been determined that the type of the error status is the non-recoverable error.

5. The printer according to claim 3, wherein the processor is configured to cause the printer to specify, as the printing result, an amount of the printing data for which printing has been completed by the printing portion.

6. A non-transitory computer-readable medium that stores a printing control program that includes instructions that cause a computer of a device that is configured to be connected to a printer through a network to execute the steps of:

transmitting to the printer, every time a printing job is initiated, the printing job being a unit in which the printer performs printing, job identification information that is unique to the printing job and device identification information that is unique to the device;

transmitting printing data for the printing job to the printer;

transmitting to the printer, every time a specified time interval elapses, a request command that requests a printing result for the printing job;

determining, in a case where a result information record that includes the printing result, the job identification information, and the device identification information has been received from the printer, whether a specified termination condition for the printing job has been satisfied, based on the result information record that has been received and on the job identification information and the device identification information that the device has transmitted; and terminating the printing job in a case where it has been determined that the termination condition for the printing job has been satisfied.

7. The non-transitory computer-readable medium according to claim 6, wherein the instructions further cause the computer to execute the steps of:

reading the printing data from a print queue, the print queue temporarily storing the printing data that have been generated by the device;

transmitting the printing data that is read from the print queue to the printer;

deleting the transmitted printing data from the print queue; and starting the transmitting of the request command in a case where all of the printing data for the printing job have been deleted from the print queue.

8. The non-transitory computer-readable medium according to claim 6, wherein the instructions further cause the computer to execute the step of:

determining that the termination condition for the printing job is satisfied in a case where the device identification information and the job identification information that are included in the result information record that was received from the printer respectively match the device identification information and the job identification information that the device has transmitted to the printer.

9. The non-transitory computer-readable medium according to claim 6, wherein the job identification information is a number that is assigned in ascending order to each one of a plurality of the printing jobs to be performed by the printer, wherein the instructions further cause the computer to execute the step of:

determining that the termination condition for the printing job is satisfied in a case where the device identification information that is included in the result information record that was received from the printer matches the device identification information that the device has transmitted to the printer and the job identification information that is included in the result information record that was received from the printer is greater than the job identification information that the device has transmitted to the printer.

10. The non-transitory computer-readable medium according to claim 6, wherein the instructions further cause the computer to execute the step of:

determining that the termination condition for the printing job has been satisfied in a case where a specified length of time has elapsed after the transmitting of the request command without the termination condition being satisfied.

* * * * *